United States Patent [19]

Chang

[11] 3,898,693

[45] Aug. 5, 1975

[54] VIDEO RECORDER/REPRODUCER TRANSPORT USING VACUUM COLUMNS AND SERVOS

[75] Inventor: David T. L. Chang, Palo Alto, Calif.

[73] Assignee: Video Memory Corporation, Santa Clara, Calif.

[22] Filed: Aug. 26, 1974

[21] Appl. No.: 500,533

[52] U.S. Cl. .................... 360/73; 226/24; 226/178; 242/183; 242/207; 360/71; 360/84

[51] Int. Cl.[2] ............... G11B 15/46; G11B 15/58; G11B 21/18

[58] Field of Search ............ 360/73, 71, 69, 90, 84, 360/83, 107; 242/182–184, 202–203, 206–209; 226/188, 178, 24, 95, 30, 44

[56] References Cited

UNITED STATES PATENTS

| | | | |
|---|---|---|---|
| 3,145,944 | 8/1964 | Pendleton | 360/90 |
| 3,487,392 | 12/1969 | Lewis | 360/90 |
| 3,688,956 | 9/1972 | Kjos | 360/90 |
| 3,751,604 | 8/1973 | Calizzano et al. | 360/90 |
| 3,772,469 | 11/1973 | Johnson | 360/84 |

OTHER PUBLICATIONS

Donald E. Morgan, The Servo System For a Helical Broadcast Recorder, Feb. 1974, Journal of The SMPTE, Volume 83, pp. 105–109.

*Primary Examiner*—Alfred H. Edleman
*Attorney, Agent, or Firm*—Schatzel & Hamrick

[57] ABSTRACT

An improved tape transport for use in the magnetic tape recording and reproducing of high frequency signals, such as video signals. The transport is adapted to include a helical scanner head assembly for recording and reproducing signals on the tape in a helical scan format. Vacuum chambers are included for handling the tape passing to and from the scanner head assembly. A vacuum chamber is positioned intermediate the tape take-up source and the capstan, and another vacuum chamber is positioned intermediate the scanner head assembly and the tape supply source. The scanner head assembly supports a separate record head and a separate playback head spaced apart relative to one another such that record and playback may be realized simultaneously.

11 Claims, 5 Drawing Figures

VIDEO RECORDER/REPRODUCER TRANSPORT USING VACUUM COLUMNS AND SERVOS

BACKGROUND OF THE INVENTION

1. Field of the Invention

The present invention relates to magnetic recording and reproducing apparatus. More particularly, the invention relates to such apparatus adapted to magnetically record and reproduce high frequency signals, such as video signals.

2. Description of the Prior Art

Tape transports for use in magnetic tape recording and reproducing of high frequency electronic signals are well known. Such transports generally include a tape deck with supply and take-up reels for storing the magnetic tape. The reels are generally rotatably supported on the tape deck on opposite sides of a transducer adapted to transduce electrical signals to and/or from the magnetic tape. A rotating drive capstan, mounted to the deck, operates to drive the tape at a predetermined speed between the supply and take-up reels. The tape is guided between the supply and take-up reels by an arrangement of guides over the transducer. For recording and reproducing high frequency signals such as video signals, the transducers are mounted on a rotatable scanning assembly in turn mounted to the tape deck. The rotational speed of the scanner and the tape speed assists in providing the head-to-head speed necessary for recording and/or reproducing video signals. The scanning assembly generally includes one or more transducing heads which operate to translate electrical signals to magnetic variations for storage on the tape during the record operation or which operate to translate magnetic signals from the tape into the original signal during the reproduce operation.

In the recording of relatively broad band frequency signals on magnetic tape and the subsequent reproduction of the signals from the tape, a helical wrap type of scanning assembly is often used. Basically, such a scanning assembly includes a pair of cylindrical drums which are axially spaced to define an annular gap therebetween. Magnetic tape, generally of approximately one inch width, is wrapped helically about the drums and is moved over the drums in the direction of its length. One or more transducer heads are rotated in the gap between the drums and sweep a rectilinear area of tape, such rectilinear area extending at an acute angle across the tape. As a result, relatively long tracks are spaced successively along the tape and extend at acute angles to the edges thereof. In the recording and playback of television signals, an entire field or, in some instances, an entire frame may be included in one of the relatively long tracks.

Many prior art transports have a tape path wherein the tape is wrapped substantially 360° in helical fashion about the scanning assembly. In one type of tape wrap, known as the Omega wrap, the tape approaches and leaves the surface of the scanning assembly at approximately the same point. The tape forms a loop about the scanning assembly approximating the shape of the Greek letter capital Omega.

Another type of transport is that heretofore most frequently used for television broadcast recording and reproducing. These types of transports are commonly referred to as quadruplex recorders and include a rotary head assembly with four transducers mounted thereon.

The head assembly transverses the tape, generally of 2 inch width, at right angles to the tape such that tracks are spaced successively along the tape and extend at right angles to the edges thereof. Quadruplex recorders have been found to produce pictures of superior quality to that of the helical scan type recorders heretofore available. However, the complexity and costs for quadruplex recorders have been substantially greater over that of the helical wrap type recorders. Also, the operating costs, wear of transducers and wear of tape of the quadruplex are also substantially greater.

Thus, it has heretofore been a trade off of quality versus costs in determining whether to use quadruplex or helical scan format type transports. As a result, the quadruplex has generally been exclusively used for broadcast purposes while the helical scan has been used for educational, industrial and communication applications not requiring the high quality performance demanded by the broadcast industry.

SUMMARY OF THE PRESENT INVENTION

Accordingly, a principal object of the present invention is to provide a magnetic recording and reproducing system and apparatus therefore, which is simple in construction and yet produces stable pictures of high quality.

A further object is to provide a recording and reproducing system of the helical wrap type which is capable of generating video signals of high quality comparable to that of the quadruplex recorder systems.

A further object is to provide a recording and reproducing system wherein the drive capstan is isolated from the tape supply and take-up reels to enable rapid operational start and stop times.

A further object is to provide a recording and reproducing system wherein recording and playback operations may be conducted simultaneously such that a recorded picture can simultaneously be played back for verification of the quality of the recording.

A further object is to provide a high quality, reliable helical wrap type recording and reproducing system which may be constructed and operated economically.

Briefly, an exemplary embodiment of a video tape transport of the present invention includes a pair of vacuum chambers mounted on a tape deck. The transport is of the helical wrap format with a V-shaped vacuum chamber positioned intermediate the supply reel and the scanner head. Another V-shaped vacuum chamber is positioned intermediate the capstan and the take-up reel. Provisions are also included in each of the vacuum chambers to vary the pressure therein. Accordingly, the tension on the tape due to the vacuum chambers may be controlled by varying the pressure and/or position of the tape within the chambers. The vacuum chambers are positioned and adapted to isolate the reels from the capstan and scanner head. This assists in providing gentle tape handling and rapid operational start up and stop times. The scanner head carries three independent transducers for processing the video information.

These transducers include a record head, a playback head and an erase head. The provision of independent record and playback transducers assists in providing electrical editing, simultaneous record verification and interchangeability of tapes recorded on other machines.

The foregoing objects, advantages and features of the invention will be apparent to those skilled in the art from the foregoing more detailed description of the preferred embodiments as illustrated in figures of the accompanying drawing.

IN THE DRAWING

DETAILED DESCRIPTION OF THE PREFERRED EMBODIMENT

Figure 1:
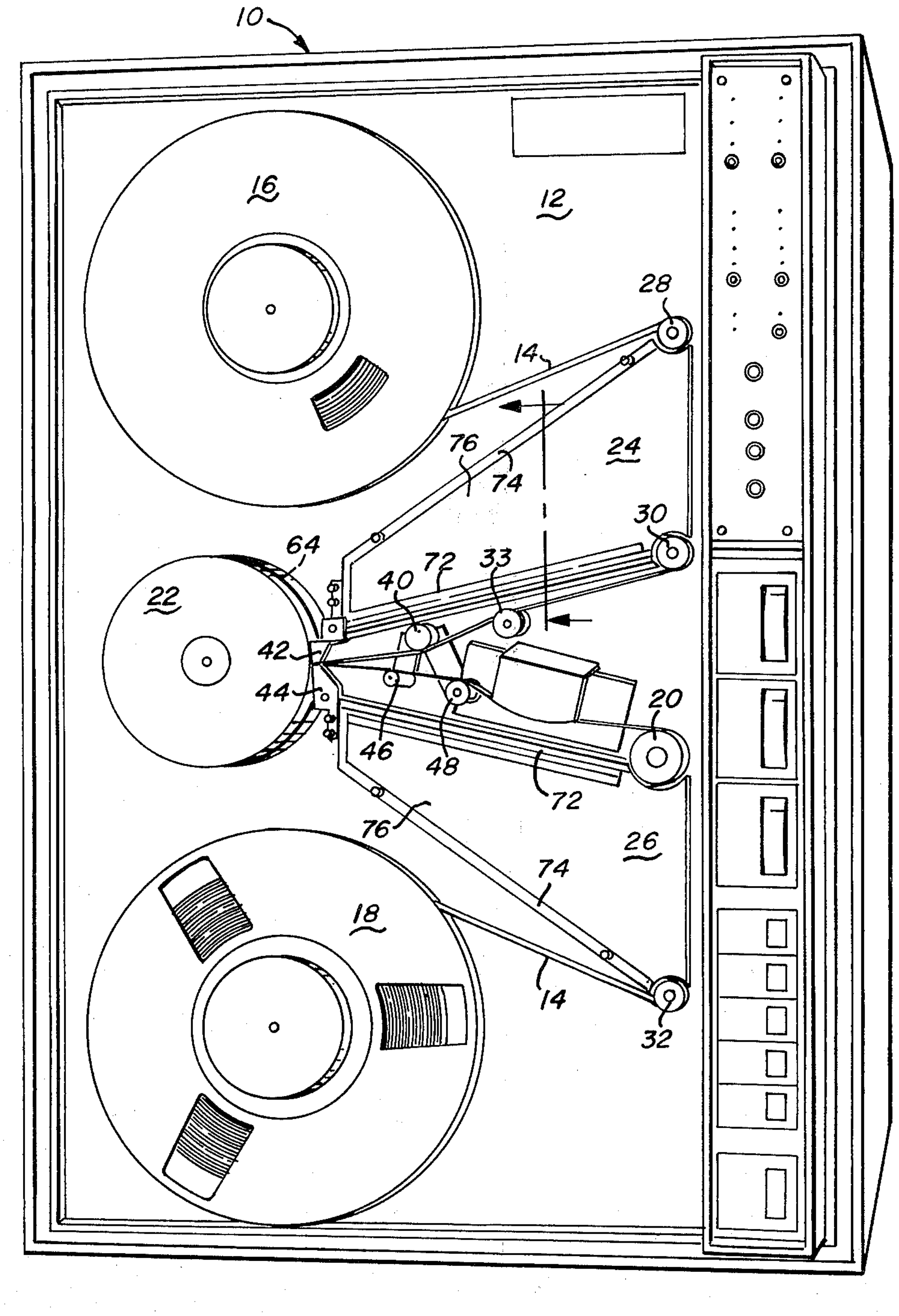
FIG. 1 is a perspective view of a video tape transport of the present invention.
Figure 2:
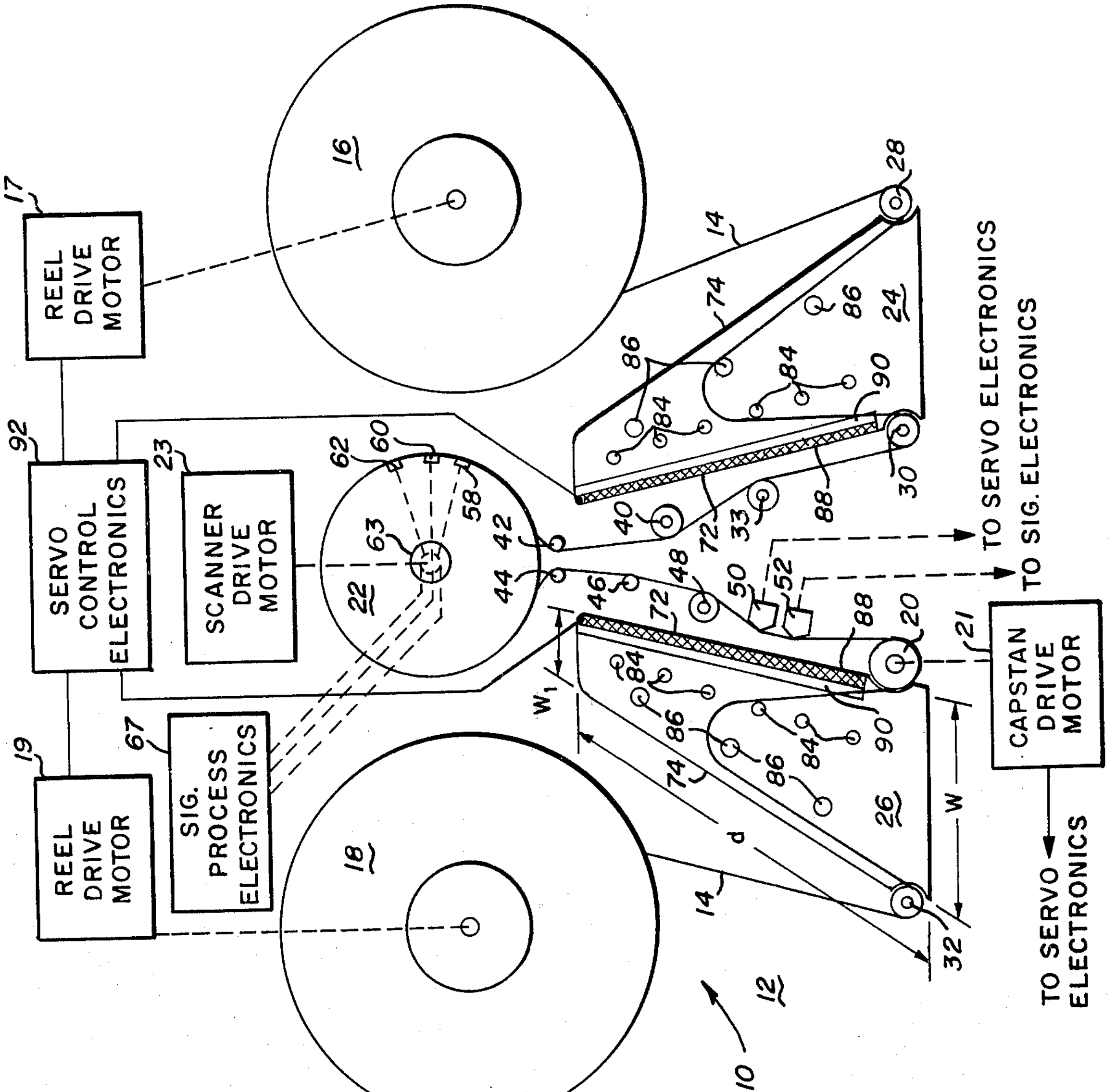
FIG. 2 is a schematic diagram of the tape path of the transport of FIG. 1 with transport rotated 90° relative to the orientation in FIG. 1.

A tape transport, referred to by the general reference character 10, and incorporating the present invention is illustrated in FIG. 1. FIG. 2 further illustrates the transport 10 schematically along with the servo control electronics and signal processing electronics. The view of FIG. 2 represents the transport in an orientation rotated 90° relative to the view of FIG. 1. The transport 10 includes a flat mounting panel 12 over which a magnetic tape 14, which may be of 1 inch width, is transported. The tape 14 is transported between a tape supply means, illustrated in the form of a supply reel 16 driven by a drive motor 17 and a tape take-up reel 18 driven by a drive motor 19. The tape 14 is driven by a cylindrical capstan 20 controlled by a drive motor assembly 21. The tape 14 is transported over a data processing center including a helical wrap scanner 22 driven by a scanner drive motor 23. The supply reel 16, take-up reel 18, capstan 20 and scanner 22 are all mounted on the panel 12 in spaced apart relationship and rotatable about axes normal to the plane of the panel.

The transport 10 further includes a pair of V-shaped (tapered) vacuum chambers 24 and 26. The vacuum chamber 24 is positioned intermediate the supply reel 16 and the scanner 22 and the vacuum chamber 26 is positioned intermediate the scanner 22 and the capstan 20. A pair of cylindrical guide spindles 28 and 30 are positioned about the entrance and exit, respectively, to the vacuum chamber 24. Also, a guide spindle 32 is positioned about the exit to the vacuum chamber 26. Each of the guide spindles 28, 30 and 32 is rotatable about its axes, which is parallel to the axes of the reels 16 and 18, so as to provide low friction guidance to the tape 14 as it enters and exits from the vacuum chambers 24 and 26. The capstan 20 is positioned adjacent to the entrance of the vacuum chamber 26. Intermediate the guide 30 spindle and the scanner 22 is a guide spindle 32 and a stationary guide 40 positioned to align the tape 14 relative to the entrance to the scanner head assembly 22.

An entrance guide post 42 is positioned immediately adjacent to the periphery of the scanner 22 at the point where the tape 14 enters the scanner head assembly. An exit guide post 44 is positioned laterally from the guide post 42 immediately adjacent to the periphery of the scanner 22 at the point where the tape 14 exits from the scanner head assembly. Thus, as illustrated in FIG. 2, the tape is guided over the interior surface of the guide 42, about the scanner 22 and over the interior surface of the guide 44 so as to form a wrap format of a shape similar to the Greek capital letter Omega. The guide posts 42 and 44 are stationary in place such that the angle and location of the entrance and exit points of the tape from the scanner head assembly 22 is fixed. Preferably that portion of the guide posts 42 and 44 which contacts the tape are comprised of a hard material with a low coefficient of friction. Guide posts 42 and 44 comprised of sapphire have been found to provide a low coefficient of friction between the tape and posts while providing a long life. Intermediate the guide post 44 and the capstan 20 is a stationary guide 46 and a spindle guide 48 and two stationary head assemblies 50 and 52. The head 50 is adapted to record and playback a control track of information longitudinally along the tape. The head 52 is adapted to record and playback a pair of audio tracks longitudinally on the tape 14.

Figure 3:
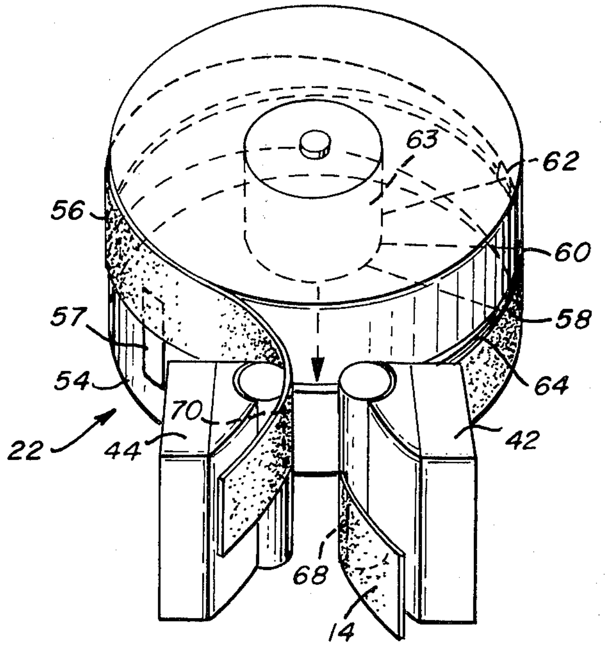
FIG. 3 is an enlarged perspective view of the scanning assembly with the tape wrapped thereabout in an Omega format, and further illustrating three individual transducers mounted on the scanning assembly.

The scanner head assembly 22 includes a pair of coaxially closely spaced drums 54 and 56 respectively. The drum 54 is stationary and the drum 56 is coupled to the drive motor 23 such that it may be rotated about its axis. As best illustrated in FIG. 3, the drums 54 and 56 may be comprised of aluminum coated with a layer 57 of an inert tough, insoluble polymer to provide a low coefficient of friction between the drum and tape and to provide long wear of the drum. For example, the layer may be comprised of a material commonly referred to as Teflon. It has also been found that by coating the drums it overcomes difficulties of the tape sticking to the drum when the drum is not operated. Tape sticking to the drum has heretofore often impaired starting up of the tape when the transport is activated for operation. In applying the layer 57, the layer material may be sprayed on to the drums and then, after the material sets and hardens, the layer material is ground to a smooth surface and a depth of 2 to 3 mils of thickness. After the transport has been operated for a substantial period of time and the layer 57 eventually wears through, the remaining portions of the material is stripped from the drums and the drums are recoated. In this manner, not only is the life of the tape prolonged, but the life of the drums 54 and 56 is also significantly lengthened.

As further illustrated in FIGS. 2 and 3, three magnetic heads 58, 60 and 62, electrically coupled to a rotary transformer 63, are supported at the peripheral surface of the rotatable drum 56 adjacent a clearance gap 64 between the drums 54 and 56. The heads 58, 60 and 62 are angularly spaced apart approximately twenty degrees relative to one another about the axis of the drum 56. In operation, the tape 14 is transported helically about the drums 54 and 56. The tape enters the scanner about the lower stationary drum 54 and exits about the upper rotary drum 56. Thus, the elevation of the tape at the point of entry is beneath the point of exit from the scanner 22. The heads 58, 60 and 62, which are always at the same elevation, thus scan diagonally across the tape along relatively long paths. The path of the heads relative to the tape is at acute angles relative to the tape edges, as illustrated by the tape segment of FIG. 5. The wrap of the tape 14 about the drums 54 and 56 is substantially diagonally bisected by the clearance gap 64.

Figure 5:
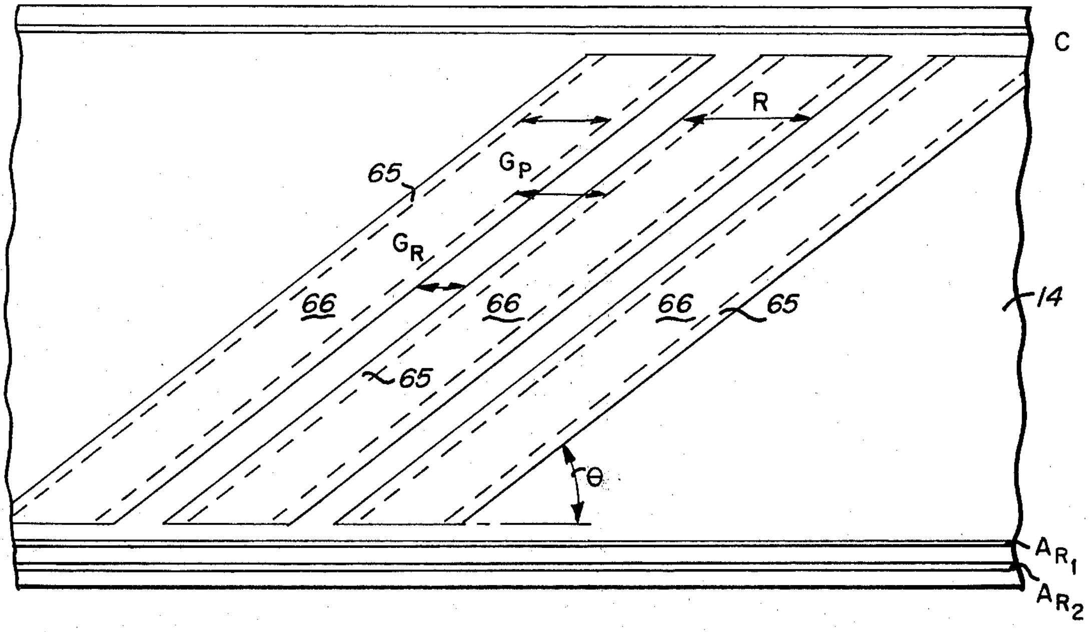
FIG. 5 is an enlarged view of a tape segment illustrating video recorded tracks, video playback tracks, guardbands, audio tracks and control tracks produced pursuant to video tape transports of the present invention.

The head 60, hereinafter referred to as the video record head, is adapted to produce a record track on the tape 14 as the head scanner rotates one revolution and the tape 14 passes thereover. Successive revolutions of video record head 60 while the tape is transported, produces record tracks R, as illustrated by the tracks 65 in FIG. 5. As further illustrated, the tracks R lie transversely across the tape 14 at an acute angle $\theta$. Successive tracks R are separated by a guard band *Gr*. The width R of the record track and the guard band *Gr* are a function of the gap of the record head 60. The head 62, hereinafter referred to as the video playback head, is adapted to reproduce the information from recorded tracks on the tape 14 as the head scanner 22 rotates and the tape 14 passes thereover. The width P of the playback tracks, as illustrated by the dashed tracks 66 in FIG. 5, is a function of the width of the gap of the playback head 62. As illustrated, the width P of the playback tracks 66 is less than the width R of the record tracks 65. However, the playback guard band *Gp* between the playback tracks 66 is greater than the guardband *Gr* between the record tracks 65.

In the video recorder industry, it has been relatively standard to have the record and playback tracks be of the same width, e.g. 5.7 mils with a guard band of 2.7 mils. The design of the present invention allows for the recording track to be significantly greater than the industry standard of 5.7 mils while the playback track is in accord with the industry standard. At the same time the present recorder/reproducer is capable of playing back tapes recorded according to the standard format. Also, tapes recorded with transports of the present invention may be played back on machines adapted for the standard format. Thus, tapes processed by the present transport may be interchanged with tapes processed in accord with the industry standard format. To realize this, the gap dimensions of the playback head 62 is selected such that the playback track width P is in accord with the standard format, e.g. 5.7 mils. This also provides for a guardband *Gp* in the playback mode comparable to the standard format, e.g. 2.7 mils. However, the record head 60 is selected such that the record track width R encompasses part of the otherwise record guardband such that the record guardband *Gr* is less than *Gp*. For example, the record track width R may be 8.0 mils and the record guardband *Gr* 0.4 mils. As illustrated in FIG. 5, a track is recorded and/or played back for each revolution of the scanner head 22. The blank spacing, i.e. guardbands, occur when the head is intermediate the entrance and exit guides 42 and 44 while the tape is transported. The machine 10 is servoed such that the blank spacing coincides with the vertical sync pulses.

The provision of the independent video record and playback heads with the increased width of the record track 65 has been found to provide for an improved signal-to-noise ratio in the playback signal. This is believed to result from the fact that mistracking is alleviated. That is, even though there may be some mistracking, since the record track 65 is wider than the playback track 66, the playback head 62 remains on the recorded track 80. It further permits both the record head 60 and the playback head 62 to be designed for optimization of their respective functions. Heretofore, one head has generally been utilized for both the record and playback function. The use of a single head for the dual functions requires that the head design be compromised in order to meet both requirements. However, with the present design, the compromise is not necessary. The record head 60 may be optimized for recording and the playback head 62 optimized for playback. The present design further allows for playback of recorded signals simultaneously with recording operations. Thus, the quality of the recorded information can be verified instantaneously without interference with the recording operations. It should also be recognized that tapes from other tape recorder/reproducing machines of the standard format may be interchanged with the present machine. Also, the recorders/reproducers according to the present invention can withstand more adverse environmental conditions than machines utilizing the standard format because larger changes in tape dimensions can be withstood without there being mistracking. The gap of the video erase head 58 is selected to be equal or slightly larger than the width of the record track. For example, the width of the track of the erase head may be approximately 8.1 mils.

The video erase head 58, video record head 60 and video playback head 62 are all coupled through the rotary transformer 63, to signal processing electronics 67 where the high frequency video signals are processed. Also, the audio record head 52 is coupled to the signal processing electronics 67 for processing of the audio information. As illustrated in FIG. 5, the audio head assembly 52 may record and/or playback. Also, a control track C is recorded and/or playback by the control track head assembly 50.

The tape 14 enters the scanner head assembly 22 at an elevation below that to which it exits. To realize this slant, the entrance guide post 42 forms a lower groove 68 over which the tape 14 is guided at the entrance point. The exit guide post 44 forms an upper groove 70 over which the tape 14 is guided at the exit point. Thus the elevation of the tape path from the exit point to the take-up reel 18 is raised relative to the tape path preceding the entrance. For 1 inch tape 14, the difference in elevation is in the order of slightly more than 1 inch.

Figure 4:
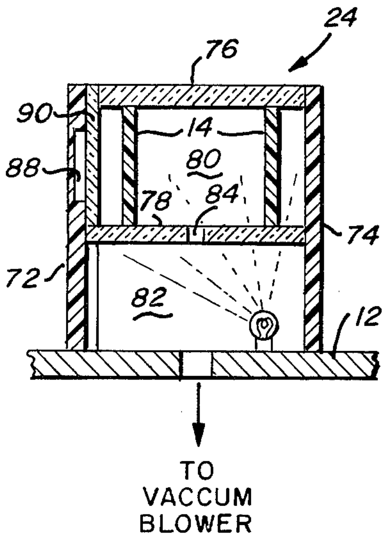
FIG. 4 is a cross-sectional view of a vacuum chamber of the transport of FIG. 1 and taken along the lines 4—4.

The vacuum chambers 24 and 26 are utilized to provide a buffer between the head scanner assembly 22 and the large mass of the supply and take-up reels 16 and 18. The chambers 24 and 26 are adapted to also control the tape tension during the operational modes. Referring to FIGS. 1, 2 and 4, each of the chambers 24 and 26 includes a pair of lateral side walls 72 and 74 which are supported over the mounting panel 12. A blackened glass cover 76 is positioned over the top side of the walls 72 and 74. A clear glass panel 78 is positioned parallel to the cover 76 intermediate the cover and the panel 12 so as to form a tape receiving channel 80 in the upper area and an evacuation channel 82 in the lower area. The depth of the channel 80 is the same width of the tape 14 with a small degree of tolerance to permit the tape to travel therethrough without interference.

The side walls 72 and 74 of the vacuum chambers 24 and 26 are of a tapered format such that the cross-sectional area of the channel 80 varies depending on the depth position within the chamber. The chambers 24 and 26 have a width W at the mouth, a width $W_1$ at the bottom, and a depth *d* between the mouth and bottom. In the illustrated preferred embodiment, W is 5 inches, $W_1$ is 1½ inches and *d* is 11 inches. The illustrated chambers are adapted to provide a tension ratio of the order of 24:1 with the minimum tension being in the order of one half ounce and the maximum tension in the order of 12 ounces. To realize the tension ratio, the chambers 24 and 26 provide for varying cross-sectional area and a plurality of spaced apart bleeding apertures 84 in the panel 78 communicating between the channels 80 and 82. In operation, as a tape loop is formed in the channel 80, and as the bottom of the loop approaches the bottom wall of the vacuum chamber, the number of holes 84 on opposite sides of the loop varies. This in turn varies the pressure differential between the top and bottom sides of the loops. The pressure is further controlled by the degree of air bleeding from the channel 80 through the openings 84. Bleeding is realized by connecting a vacuum blower (not shown) to the evacuation channel 82 as schematically illustrated in FIG. 4.

Theoretically, during operation, the tension on the tape is known to be a function of a change in pressure and the cross-sectional area is expressed mathematically $T = ½ \Delta PA$ where $T$ represents tape tension, $\Delta P$ represents the difference in pressure on the tape, and $A$ represents the cross-sectional area of the channel. Thus, the chambers 24 and 26 are adapted to provide for both a change in pressure (ΔP) and a change in the cross-sectional area ($a$) to realize the desired tension ratios.

The chambers 24 and 26 also support a light source 86 positioned adjacent to the bottom of the side wall 74 within the evacuation channel 82. The sources 86 are positioned to project a light within the channel 82 and up through the panel 78 to within the channel 80. The blackened top cover 76 discourage ambient light from entering the channel 80. The side wall 72 of each of the chambers 24 and 26 carries a strip of solar cells 88 with the strip extending longitudinally along the wall to serve as photo detectors. The strip 88 extends from a point adjacent to the mouth to a point near the bottom of the chambers 24 and 26. A glass plate 90 is positioned over the interior of the wall 72 and over the strips 88 to protect the tape 14 from coming in contact with the detectors. During operation, as the depth of the loop of the tape within the channels 80 varies, the surface area of the strips 88 exposed to light generated from the light sources 86 varies. The solar cell strips 88 are adapted to generate control signals, the magnitude of which is dependent upon the area of the strips 88 exposed to light. The generated signals are in turn delivered to the servo control electronics which in turn generates servo signal to control the speed of the capstan and motors driving the take-up and supply reels such that the tape tension about the capstan and scanner are substantially maintained at the appropriate value.

The implementation of the vacuum chambers 24 and 26 in the transport path isolates the high mass reels 16 and 18 from the capstan 20 and the scanner 22. This provides for gentle but firm instantaneous handling of the tape 14 over the head scanner 22. This provides for good base stability of the recorded and reproduced information. This also provides for rapid start and stop times of the record and playback operations as it is not necessary for the supply and take-up reels to come up to speed before processing of the information can commence. The vacuum chambers retain a sufficient supply of tape to permit the reels to catch up after the processing has commenced. For example, the start-up and stop times may be in the order of 1 second for transports of the present invention.

The signals from the photo detectors 88 is directed to a servo control electronics 92 for processing and delivering appropriate servo control signals. Also, the capstan drive motor assembly 21, reel motor drives 17 and 19, and the scanner drive motor 23 are coupled to the servo electronics 92 such that precise speed control of the tape is preserved during the various modes of operation.

While this invention has been particularly shown and described with reference to a preferred embodiment thereof, it will be understood by those skilled in the art that various changes in form and detail may be made therein without departing from the spirit and scope of the invention.

What is claimed is:

1. A video magnetic tape recording/playback transport apparatus, comprising in combination:

a tape supply means for providing a supply of magnetic recording tape;

a tape take-up means for receiving tape supplied by said tape supply means;

a drive capstan means intermediate the tape supply means and the tape take-up means for driving tape intermediate the tape supply means and the tape take-up means;

a helical head scanner assembly positioned intermediate said capstan and one of said tape means and having a pair of substantially cylindrical coaxially closely spaced drums having a clearance gap therebetween, one of said drums being fixed and the other being rotatable relative to the fixed drum, the head scanner assembly including a record head and a playback head angularly spaced relative to one another and means for driving said heads in a rotary path about the axis of the drums;

means for guiding magnetic tape along a helical path about said drums extending substantially diagonally across said gap and the path of said heads;

means for rotating said rotatable drum and said heads about the axis of the drums;

a first V-shaped vacuum chamber intermediate the helical head scanner and the tape supply means with first sensing means for sensing the position of tape within said first chamber and generating first signals responsive to the position of tape within said first chamber;

a second V-shaped vacuum chamber intermediate the helical head scanner and the tape take-up means with second sensing means for sensing the position of tape within said second chamber and generating second signals responsive to the position of tape within said second chamber; and servo control means responsive to the first signals and the second signals for generating servo control signals to the drive capstan.

2. A video magnetic tape recorder/playback transport apparatus as recited in claim 1 wherein the record head is adapted to record tracks diagonally on magnetic tape, which record tracks are of a width greater than the width of the playback track.

3. A video magnetic tape recorder/playback transport apparatus as recited in claim 1 wherein each of said vacuum chambers include means for varying the pressure within the chambers such that the tape tension is a function of the cross-sectional area of the chamber and the pressure differential.

4. A video magnetic tape recorder/playback transport apparatus as recited in claim 3 wherein the record head is adapted to record tracks diagonally on magnetic tape which record tracks are of a width greater than the width of the playback track.

5. A video magnetic tape recorder/playback transport apparatus as recited in claim 3 wherein each of said vacuum chambers comprise a first channel for receiving a loop of said tape and an evacuation channel adjacent to said first channel, a partition wall separating said first and said evacuation channels, a plurality of spaced apart bleeding openings extending through said partition wall, said bleeding openings being spaced apart such that as the length of the tape loop within the chamber varies, the number of bleeding apertures on opposite sides of the tape varies, thereby varying the pressure differential on opposing sides of the tape looped in the chamber.

6. A video magnetic tape recorder/playback transport apparatus as recited in claim 5 wherein each of said vacuum chambers includes a blackened cover over said first channel, a photo-detector means extending along a side wall of the first channel adjacent to the travel path for a tape loop within the chamber, a light source within the evacuation chamber for generating light within the first channel, said photo-detector generating responsive electrical signals dependent upon the degree of area of said photodetector means blocked off from said generated light by the magnetic tape loop within the chamber.

7. A video magnetic tape recorder/playback transport apparatus as recited in claim 4 wherein each of the drums are comprised of a metallic material with the peripheral surface coated with a layer of inert, insoluble polymer to provide a low coefficient of friction between the surface of the drums and the tape transported thereover.

8. A video magnetic tape recorder/playback transport apparatus as recited in claim 1 wherein the head scanner assembly includes an erase head angularly spaced relative to the record head and the playback head, said erase head being movable in the rotary path simultaneously with movement of the record and playback.

9. A video magnetic tape recorder/playback transport apparatus as recited in claim 8 wherein the record head is adapted to record tracks diagonally on magnetic tape which record tracks are of a width greater than the width of the playback track, and the erase head is adapted to erase recorded tracks of a width at least equal to the width of the record head.

10. A video magnetic tape recorder/playback transport apparatus as recited in claim 1 wherein a first stationary guide is positioned immediately adjacent to the periphery of the helical head scanner assembly to guide tape entering the helical path about said drums;

a second stationary guide is positioned immediately adjacent to the periphery of the helical head scanner assembly to guide tape exiting the helical path about said drums, the lateral spacing between said first and second stationary guides being such the the tape wrapped about the scanner assembly is substantially, but less, than 360°.

11. A video magnetic tape recorder/playback transport apparatus as recited in claim 1 wherein the playback head is coupled to signal processing electronics and the record head is coupled to signal processing electronics such that playback and recording operations may be conducted simultaneously.

* * * * *